United States Patent
Ahls et al.

[11] Patent Number: 5,806,653
[45] Date of Patent: Sep. 15, 1998

[54] ROLLER ASSEMBLY FOR A PASSENGER CONVEYOR STEP CHAIN

[75] Inventors: Hermann W. Ahls, Obernkirchen; Angelika Minta; Birgit Glogau, both of Lindhorst, all of Germany

[73] Assignee: Otis Elevator Company, Farmington, Conn.

[21] Appl. No.: 574,807

[22] Filed: Dec. 19, 1995

[51] Int. Cl.$^6$ .................................................. B66B 21/02
[52] U.S. Cl. .................... 198/326; 198/500; 198/845; 384/461; 384/474
[58] Field of Search .................... 198/326, 330, 198/500, 845; 384/461, 474

[56] References Cited

U.S. PATENT DOCUMENTS

| | | | |
|---|---|---|---|
| 4,101,180 | 7/1978 | Anderson et al. | 198/845 |
| 4,602,407 | 7/1986 | Gresens | 384/461 |
| 5,072,824 | 12/1991 | Rontgen | 198/500 |
| 5,137,135 | 8/1992 | Pietsch et al. | 198/326 |
| 5,293,982 | 3/1994 | Ahls et al. | 198/332 |
| 5,301,773 | 4/1994 | Jamieson et al. | 187/88 |
| 5,468,376 | 11/1995 | Bates | 198/500 |

FOREIGN PATENT DOCUMENTS

| | | | |
|---|---|---|---|
| 0119898 | 9/1984 | European Pat. Off. | F16G 13/06 |
| 0094110 | 6/1986 | European Pat. Off. | B65G 45/02 |
| 4334064 | 4/1995 | Germany | B66B 23/02 |

OTHER PUBLICATIONS

"Unlubricated Escalator Chain Bushes Reduce Maintenance and Fire Risk" by Clive Corbould and Sandy Polak, May 95/Elevator World, pp. 80 & 82.

*Primary Examiner*—Joseph E. Valenza

[57] ABSTRACT

A roller assembly for a passenger conveyor step chain includes a rolling contact bearing disposed between a bushing and an axle of the roller assembly. The rolling contact bearing improves wear resistance and load carrying capabilities of the roller assembly and step chain. In a particular embodiment, the roller assembly includes a pair of seals and a lubrication chamber. The seals define a sealed region encompassing the rolling contact bearing and lubrication chamber. The seals prevent lubrication from leaking and debris from penetrating into the sealed region.

14 Claims, 4 Drawing Sheets

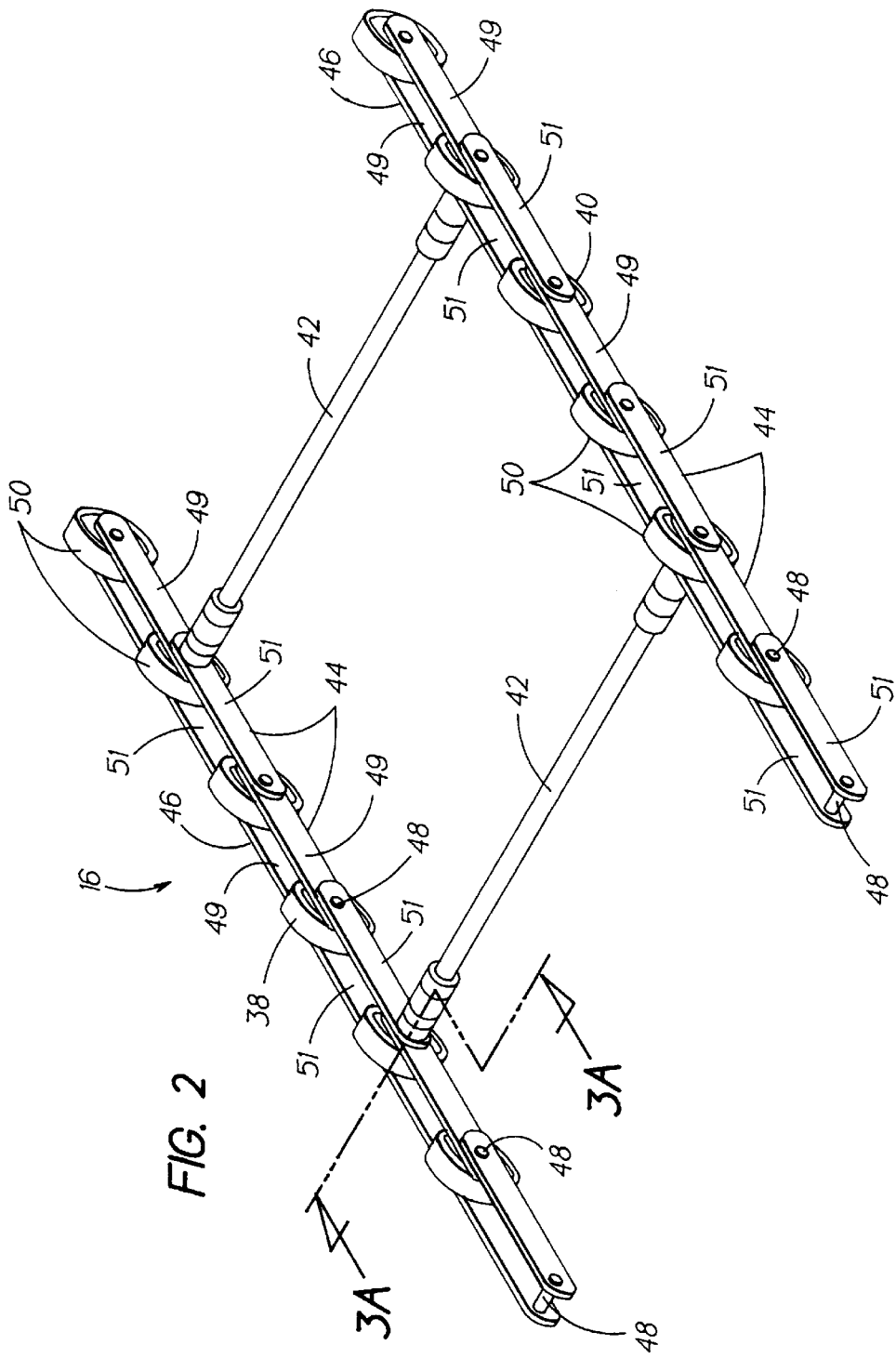

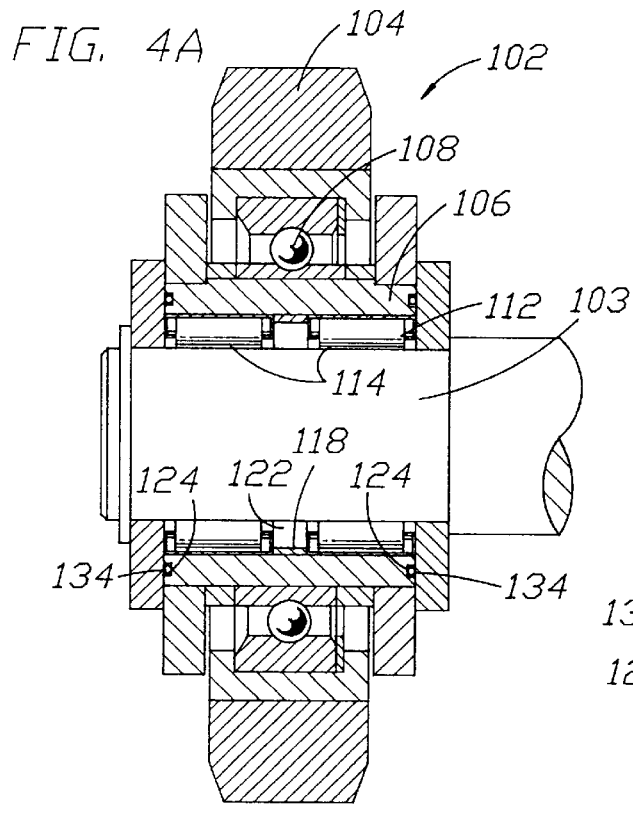
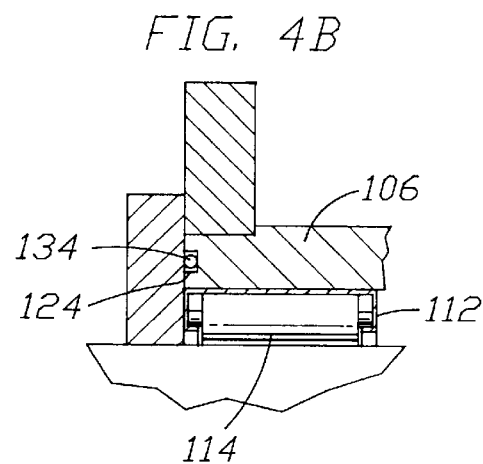
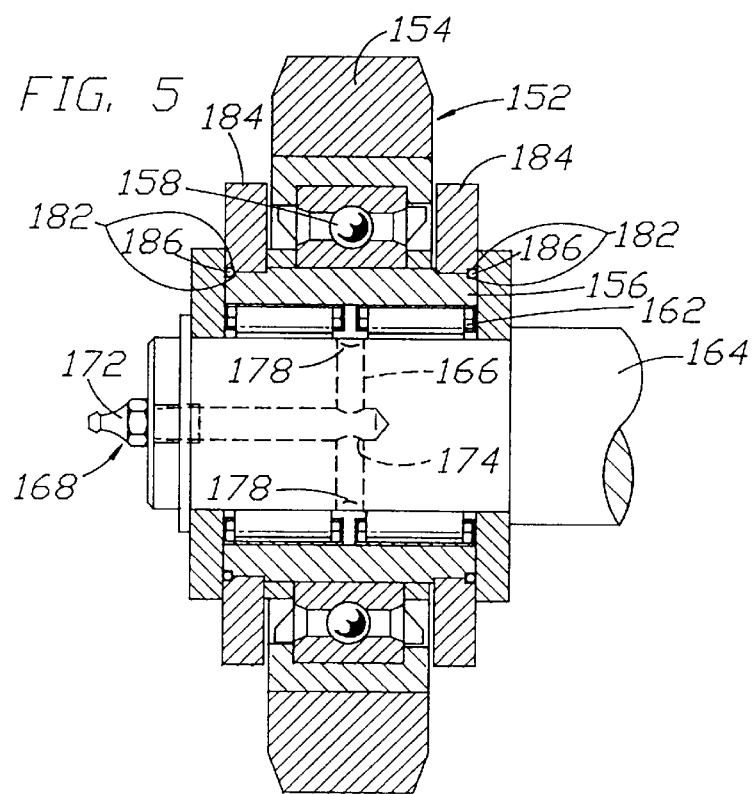

_5,806,653_

ROLLER ASSEMBLY FOR A PASSENGER CONVEYOR STEP CHAIN

TECHNICAL FIELD

The present invention relates to step chains for passenger conveyors, and more particularly to roller assemblies for such step chains.

BACKGROUND OF THE INVENTION

Escalators are a known method for conveying people from a first elevation to a second elevation. Typically, an escalator includes a frame, a drive, a step chain and a pair of balustrade assemblies. The drive typically drives a step chain sprocket assembly consisting of a pair of step chain sprockets, a pair of handrail sprockets, and an axle extending from one side of the frame to the other. The two step chain sprockets power the step chain.

The step chain is formed in a loop running from the first elevation to the second elevation. The step chain consists of a pair of chain strands, having a plurality of roller assemblies, and a plurality of step axles for connecting the two chain strands. Each strand is formed from a plurality of chain links. Each link has a pair of side plates, a roller assembly, and either a step axle or a roller pin. The axles or pins are received within a bushing of the roller assembly. The roller assembly includes a roller and the bushing, with a roller bearing interposed between the roller and the bushing. Sequentially adjacent links have alternating outer side plates and inner side plates. The outer side plates connect adjacent pins and/or axles, and the inner side plates connect adjacent bushings. This link arrangement is repeated as many times as is necessary to arrive at the desired length strand, and therefore the desired length chain.

A common problem with conventional step chains is the level of maintenance required to keep them operable. The contact surfaces between the bushings and axles and/or pins and the contact surfaces between inner and outer plates require frequent lubrication to minimize wear and noise. This is especially significant for outdoor escalators that are operated in more damaging environments, exposing the step chains to the penetration of dirt and moisture onto the contact surfaces. In addition, outdoor escalators typically have higher rises that result in greater loading of the step chains.

Recent developments in the area of passenger conveyor step chains have included having bushings or sleeves formed from plastics embedded with lubrication. An example of this type of step chain is disclosed in German Patent No. 4,334,064. The step chain disclosed therein includes a thin-walled thermoplastic bushing disposed between a steel bushing and a steel link pin. The thermoplastic bushing is embedded with solid lubricants.

These types of step chains suffer from several potential reliability and durability limitations. First, while they may minimize or eliminate the maintenance necessary to maintain proper lubrication, the rate of wear and degradation of the step chain components are not relatively constant with time as are traditional metallic step chains. The thermoplastic bushings can degrade suddenly. This may lead to a shut-down of the passenger conveyor for replacement of the entire step chain with little or no warning. In addition, the use of thermoplastic parts limits the loading that can be applied to the step chain, thereby limiting the rise and passenger carrying capacity of the passenger conveyor.

The above art notwithstanding, scientists and engineers under the direction of Applicant's Assignee are working to develop step chains that perform reliably over extended periods of time with minimal maintenance.

DISCLOSURE OF THE INVENTION

According to the present invention, a step chain includes a roller assembly having a first bearing disposed between a roller and a bushing and a second rolling contact bearing disposed between the bushing and an axle. In a particular embodiment, the second rolling contact bearing is of the needle type roller bearing. Having the second rolling contact bearing between the bushing and the axle results in a step chain that can be used in heavier duty, higher load applications than the conventional plastic, self-lubricating type bearings. In addition, the rolling contact bearing will not exhibit the noise and wear drawbacks of the conventional lubricated metallic bushings.

According to a specific embodiment, the roller assembly further includes a lubrication chamber and a pair of seals. The lubrication chamber is proximate to the second rolling contact bearing and is adapted to retain lubricating fluid for the roller assembly. The pair of seals are disposed between adjacent inner and outer side plates of the step chain to define a sealed region. The sealed region encompasses the lubrication chamber, the second rolling contact bearing and the engagement region between the bushing and the outer side plates.

Providing a sealed region and a lubrication chamber results in a step chain that requires minimal or no manual lubrication. The lubrication chamber provides an available source of lubrication fluid. The seals block lubrication fluid from leaking out of the sealed cavity. Therefore, the step of manually providing additional lubrication during operation of the passenger conveyor will be minimized or eliminated. Further, the useful life of the step chain is maximized as a result of the sealed cavity. The seals block debris from penetrating into the sealed cavity and onto the contact surfaces of the roller assembly. In addition, the sealed cavity extends the useful life of the lubricant by preventing the lubricant from drying out.

The foregoing and other objects, features and advantages of the present invention become more apparent in light of the following detailed description of the exemplary embodiments thereof, as illustrated in the accompanying drawings.

BRIEF DESCRIPTION OF THE DRAWINGS

FIG. 2 is a perspective view of a step chain.

FIG. 4A is a sectional view of a roller assembly showing an alternate embodiment of the invention.

FIG. 4B is a sectional view of the portion of the roller assembly encompassed by dashed line X in FIG. 4A.

FIG. 5 is a sectional view of a roller assembly showing a further alternate embodiment of the invention.

BEST MODE FOR CARRYING OUT THE INVENTION

Figure 1:
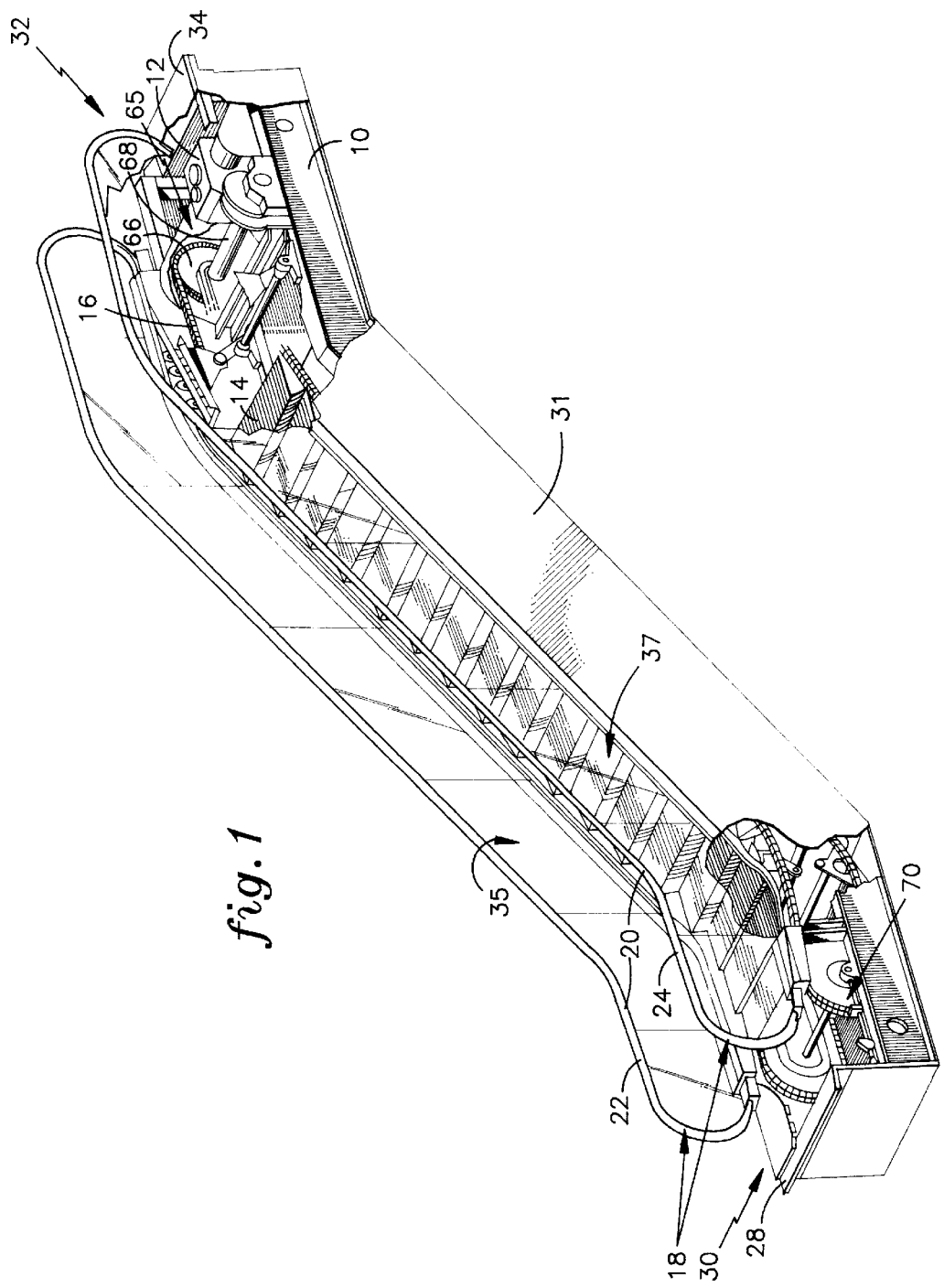
FIG. 1 is an isometric view of an escalator with broken away sections showing details.

As illustrated in FIG. 1, an escalator is shown having a frame 10, a drive 12, a plurality of tread plates 14 attached to a step chain 16, and a pair of balustrades 18 for guiding a pair of handrails 20. Although an escalator is used for illustrative purposes, it should be noted that the invention is equally applicable to other passenger conveyors that use step chains to drive a plurality of tread plates, such as moving walks.

The frame 10 typically consists of a weldment of structural steel angularly extending from a first elevation 30 to a second elevation 32. As is conventional, the frame 10 includes pairs of matching roller tracks (not shown) fixed to the frame. One half of each pair is fixed to the left hand side of the frame 10 and the other half to the right side of the frame 10. The frame 10 also forms the structural basis for a landing on each elevation. Hence, the frame 10 begins with a lower landing 28 at the first elevation 30, then angularly extends upward via an inclined midsection 31 to the second elevation 32, where it meets an upper landing 34. The upper landing 34 typically provides the support for the drive 12 used to power the handrails 20 and the step chain 16.

The step chain 16 follows a circuitous path which allows it to draw the attached tread plates 14 either up or down the inclined midsection 31 between elevations. Referring now to FIG. 2, the step chain 16 comprises a left 38 and a right strand 40 and a plurality of axles 42. The left 38 and right 40 strands are left and right hand versions of the same strand. The strands 38, 40 comprise a plurality of links 44 pivotally attached to one another. Each link 44 has a pair of side plates 46 and a roller assembly 50 disposed on either a pin 48 or one of the axles 42. The axle 42 or pin 48 is received in the center of the roller assembly 50. The side plates 46 include inner side plates 49 and outer side plates 51 connecting adjacent roller assemblies 50.

Figure 3A:
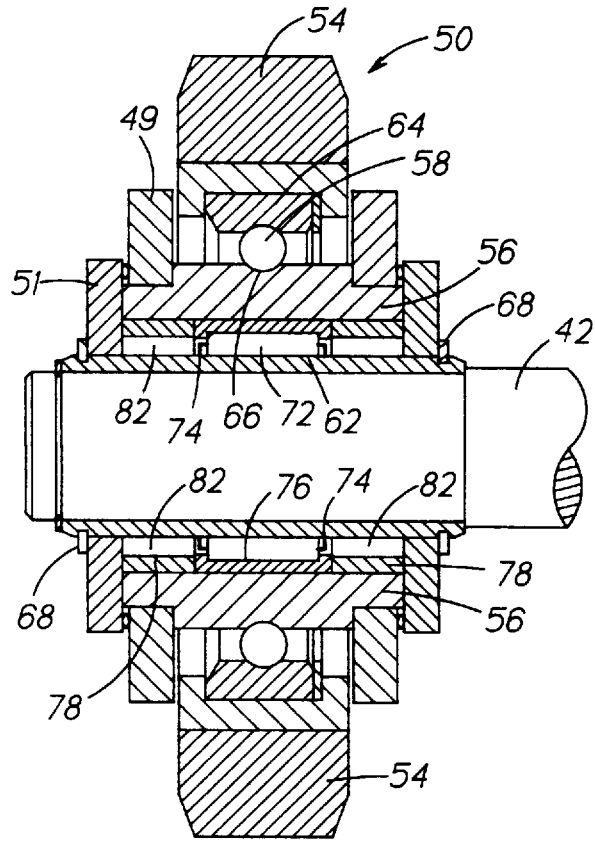
FIG. 3A is a sectional view of a roller assembly of the step chain, taken along line 3A—3A of FIG. 2.
Figure 3B:
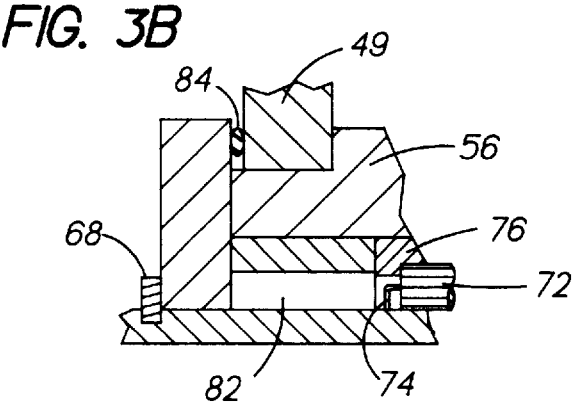
FIG. 3B is a sectional view of the portion of the roller assembly encompassed by dashed line X in FIG. 3A.

As shown in more detail in FIGS. 3A and 3B, each roller assembly 50 includes a roller 54, a bushing 56, a first rolling contact bearing 58 intermediate between the roller 54 and the bushing 56, and a second rolling contact bearing 62 intermediate between the bushing 56 and the axle 42. The roller 54 is formed from an elastomeric material and rotates about the bushing 56 via the first rolling contact bearing 58, which as shown is of the spherical ball bearing type with an outer race 64 engaged with the roller 58 and an inner race 66 integral to the bushing. The bushing 56 is laterally disposed between the outer side plates 51 and is engaged in a fixed manner to the inner side plates 49. The roller assembly 50 and side plates 49, 51 are located and retained to the axle 42 by an opposing pair of snap rings 68.

The second rolling contact bearing 62 is of the needle bearing type and permits the bushing 56 to move freely relative to the axle 42. The second rolling contact bearing 62 includes a plurality of needle bearings 72 spaced about and in rolling contact with the axle 42, a cage 74 on both sides of the plurality of needle bearings 72, an outer race 76 disposed between the needle bearings 72 and the bushing 56, and a pair of spacers 78 that space the second rolling contact bearing 62 from the outer side plates 51.

Radially inward of each of the spacers 78 is a lubrication chamber 82. Each of the lubrication chambers 82 defines a cavity to retain a lubricating medium for the rolling contact surfaces between the needle bearings 72, outer race 76 and axle 42 and for the sliding contact surfaces between the outer side plates 51 and the bushing 52 and spacers 78.

Radially outward of the lateral edges of the bushing 52 and compressed between opposing surfaces of the outer side plates 51 and inner side plates 49 is a seal 84. The seals 84 define a sealed region that extends between the bushing 56 and axle 42 and between the bushing 56 and outer side plates 51. The seals 84 block the escape of lubricating medium out of the sealed region and also block contamination of the sealed region by debris and moisture present in the operating environment of the step chain 16.

An alternate embodiment of the present invention is illustrated in FIGS. 4A and 4B which show a roller assembly 102 disposed about an axle 103. In this embodiment, the roller assembly 102 includes a roller 104, a bushing 106, a first rolling contact bearing 108 intermediate between the roller 104 and the bushing 106, and a second rolling contact bearing 112 intermediate between the bushing 106 and the axle 103. The roller 104 and first rolling contact bearing 108 are similar to that illustrated in FIGS. 2 and 3 and described previously.

The second rolling contact bearing 112, however, includes two pluralities of needle bearings 114 spaced longitudinally on the axle 103. The second rolling contact 112 bearing further includes a spacer 118 between the pluralities of needle bearings 114, and a lubrication chamber 122. As compared to the single plurality of needle bearings shown in FIGS. 2 and 3, the embodiment of FIG. 4 provides the additional advantages of greater load capacity for the roller assembly. In addition, using multiple rows may provide the option to use standard, commercially available needle bearings for applications in which a single row of standard size needle bearings may not be practical.

In addition to having multiple rows of needle bearings 114, the embodiment of FIG. 4 also includes a recess 124 in the outer edges of the bushing 106. The recesses 124 define a seat for an O-ring type seal 134. This seat ensures proper location of the seal 134 and provides additional retention for the seal 134.

Although the embodiments illustrated in FIGS. 1–4 are shown as step chains having self contained roller assemblies without the need for further lubrication, there may be applications in which it is desirable to have the option of providing additional lubrication as necessary. The alternate embodiment illustrated in FIG. 5 includes means to provide additional lubricating medium as necessary.

As shown in FIG. 5, a roller assembly 152 includes a roller 154, a bushing 156, a first rolling contact bearing 158 intermediate between the roller 154 and the bushing 156, and a second rolling contact bearing 162 (shown schematically) intermediate between the bushing 156 and an axle 164. The components described thus far are similar to those illustrated in FIG. 4 and described previously. The roller assembly 152 further includes, however, a passage 166 extending radially through the axle 164 and a lubricating device 168 having a head 172 extending outward from the axle 164. The passage 166 defines means to communicate lubricating medium from an ejection point 174 of the lubricating device 168 into the sealed region of the roller assembly 152. As shown in FIG. 5, the passage 166 has an opening 178 located longitudinally between the pair of needle bearings 162. If necessary, a conventional lubrication injector (not shown) may be connected to the lubricating head 172 and lubrication fluid injected through the device 168, radially outward through the passage 166 and into the sealed region. As is well known, upon removal of the lubrication injector, the lubricating head 172 is self-sealing.

In addition, the embodiment of FIG. 5 also includes a complimentary pair of chamfered edges 182 on the bushing 156 and the inner side plates 184. The pair of chamfered edges 182 mate to define a seat for an O-ring type seal 186 and provides retention for the seal 186.

Although the invention has been shown and described with respect to exemplary embodiments thereof, it should be understood by those skilled in the art that various changes, omissions, and additions may be made thereto, without departing from the spirit and scope of the invention.

What is claimed is:

1. A step chain for a passenger conveying device, the step chain including a plurality of pins, a plurality of roller assemblies engaged with the pins, and a plurality of side plates interconnecting the roller assemblies, the plurality of side plates including inner side plates and outer side plates, each of the plurality of roller assemblies including:

a roller;

a bushing engaged with a pair of the inner side plates and extending between the pair of outer side plates, wherein the bushing is in sliding engagement with the outer side plates;

a first rolling contact bearing disposed between the roller and the bushing to permit relative rotational motion between the roller and bushing;

a second rolling contact bearing disposed between the bushing and the pin to permit relative motion between the bushing and the pin;

a chamber proximate to the second rolling contact bearing to define a lubrication chamber for retaining lubricant; and a pair of seals, each of the seals disposed adjacent to the outer side plate to define a sealed region, the sealed region encompassing the lubrication chamber, the second rolling contact bearing and the engagement between the bushing and the outer side plates.

2. The step chain according to claim 1, wherein the second rolling contact bearing includes a plurality of needle bearings.

3. The step chain according to claim 1, wherein the second rolling contact bearing is spaced longitudinally from the outer side plates to define the lubrication chamber.

4. The step chain according to claim 1, wherein the second rolling contact bearing includes a plurality of rows of needle bearings, the rows of needle bearings spaced longitudinally.

5. The step chain according to claim 1, further including a lubricating head for injecting lubricating fluid into the roller assembly and a passage extending through the pin, the passage providing fluid communication between the lubricating head and the second rolling contact bearing.

6. The step chain according to claim 1, wherein the inner side plates include a chamfered edge, wherein the bushing includes a chamfered edge, and wherein the chamfered edges of the inner side plates and bushing mate to define a seat to retain a seal.

7. The step chain according to claim 1, wherein the bushing includes a recess in an outer edge to define a seat to retain a seal.

8. A roller assembly for a passenger conveyor step chain, the step chain including a pin, a pair of inner side plates, and a pair of outer side plates, the roller assembly including:

a roller;

a bushing engaged with the pair of inner side plates and extending between the pair of outer side plates, wherein the bushing is in sliding engagement with the outer side plates;

a first roller bearing disposed between the roller and the bushing to permit relative rotational motion between the roller and bushing;

a second roller bearing disposed between the bushing and the pin to permit relative motion between the bushing and the pin;

a chamber proximate to the second rolling contact bearing to define a lubrication chamber for retaining lubricant; and a pair of seals, each of the seals disposed adjacent to the outer side plate to define a sealed region, the sealed region encompassing the lubrication chamber, the second rolling contact bearing and the engagement between the bushing and the outer side plates.

9. The roller assembly according to claim 8, wherein the second rolling contact bearing includes a plurality of needle bearings.

10. The roller assembly according to claim 8, wherein the second rolling contact bearing is spaced longitudinally from the outer side plates to define the lubrication chamber.

11. The roller assembly according to claim 8, wherein the second rolling contact bearing includes a plurality of rows of needle bearings, the rows of needle bearings spaced longitudinally.

12. The roller assembly according to claim 8, further including a lubricating head for injecting lubricating fluid into the roller assembly and a passage extending through the axle, the passage providing fluid communication between the lubricating head and the second rolling contact bearing.

13. The roller assembly according to claim 8, wherein the inner side plates include a chamfered edge, wherein the bushing includes a chamfered edge, and wherein the chamfered edges of the inner side plates and bushing mate to define a seat to retain a seal.

14. The roller assembly according to claim 8, wherein the bushing includes a recess in an outer edge to define a seat to retain a seal.

* * * * *